Dec. 18, 1956  A. J. TIERI  2,774,098
OPHTHALMIC MOUNTING HINGE
Filed Aug. 19, 1952  2 Sheets-Sheet 1

INVENTOR
ARTHUR J. TIERI

BY Ralph J. Barrett

ATTORNEY

Dec. 18, 1956 A. J. TIERI 2,774,098
OPHTHALMIC MOUNTING HINGE
Filed Aug. 19, 1952 2 Sheets—Sheet 2

INVENTOR
ARTHUR J. TIERI
ATTORNEY

United States Patent Office 2,774,098
Patented Dec. 18, 1956

2,774,098

OPHTHALMIC MOUNTING HINGE

Arthur J. Tieri, Worcester, Mass.

Application August 19, 1952, Serial No. 305,107

4 Claims. (Cl. 16—128)

In the optical art, and particularly in the manufacture of eyeglass and spectacle connections and in temple connections therefor, there has been difficulty in providing suitable hinge means capable of being positively secured in position without misalignment of associated parts and which when the parts are assembled will not permit the hinged parts to become loose or separated or distorted from their proper hinge axis.

It is the object of this invention to provide a hinge structure in which the hinge is so constructed and arranged that the parts being hingedly associated are properly and permanently aligned during positioning of an expandable hinge sleeve on its axial core or pin and when thus assembled permanent association of all parts is provided and loosening or separation of the hinge joint prevented.

Another object is to provide a simple means of preventing the spreading apart of the ears of a hinge thereby allowing the hinge to function properly for a greater period of time than is now possible.

Another object is the use of a locking pin or core for the expansible sleeve which after functioning to expand the sleeve and align and assemble the hinged parts may, if desired, be removed without affecting the hinge itself.

Another object of this invention is to provide an inconspicuous or concealed method of securing members of a hinge to each other in a substantially permanent fashion.

Other objects and features of the invention will more clearly hereinafter appear by reference to the accompanying drawings forming a part of the instant application wherein like characters of reference designate corresponding parts throughout the several views, in which.

Figure 3:
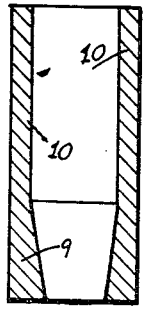
Fig. 3 is a vertical section through one form of hinge tube before assembly.
Figure 3A:
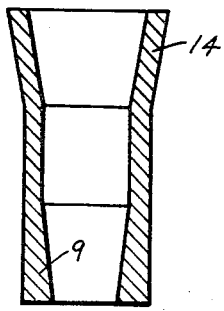
Figures 4, 4A:
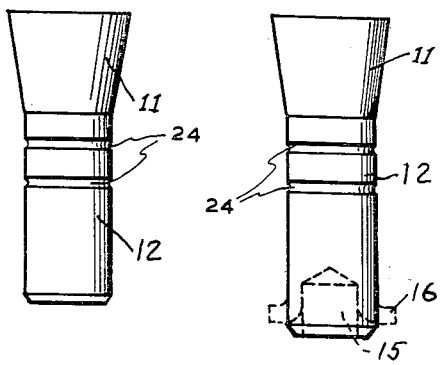
Figure 5:
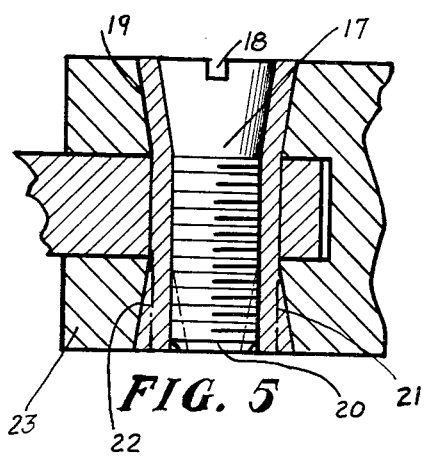
Figure 6:
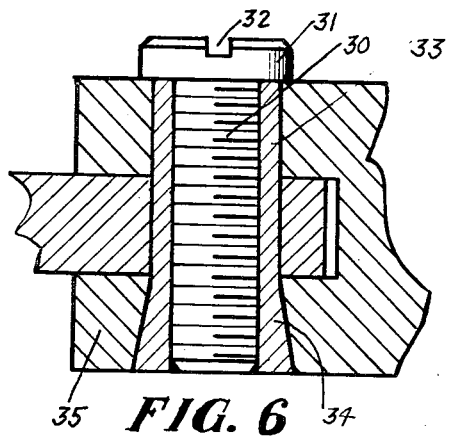
Figure 7:
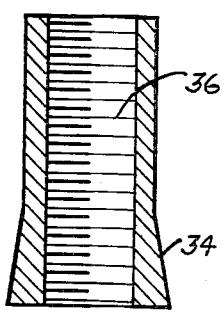
Figure 8:
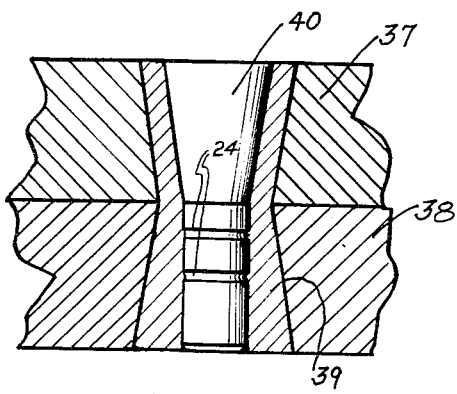

Fig. 3ª is a vertical section of another form of hinge tube;

Fig. 4 is a side elevation of one form of pin or core member;

Fig. 4ª is a side elevation of a modified form of pin;

Fig. 5 is a vertical section through a modified hinge joint showing a threaded pin or core;

Fig. 6 is a similar view showing a further modified assembly;

Fig. 7 is a vertical sectional view through a hinge sleeve having a threaded bore; and Fig. 8 is a vertical sectional view of a riveted joint.

Normally the invention will include a deformable tube of a material capable of being deformed without excessive pressure and having the characteristics of retaining its shape of deformation. Suitable materials may be found in metals and plastics, or a combination of both, depending upon the nature of the parts being hinged, it being understood that although the device is shown and described primarily as an ophthalmic mounting, it is adaptable for use in many arts and quite capable of hinging either metal or plastic parts regardless of their size.

It will be obvious to one skilled in the art that in ophthalmic mountings it is customary to have the end of a temple member, such as indicated by reference character 1, bifurcated at its hinged extremity to provide upper and lower legs 2 and 3 formed with vertical aligned openings 4 and 5, these openings converging inwardly uniformly to provide conical surfaces as shown. The angle of the taper of the conical faces may vary according to the nature of the work and particularly as required by the material from which the expandable hinge sleeve is formed, it being desirable that axial flow of the material of the sleeve be prevented. In the primary development it is intended that the assembly include a cylindrical surface intermediate the conical surfaces, and this is accomplished by having the hinge lug 6 projecting from the eyeglass frame 7 formed with the vertical annular opening 8 to associate with a similarly formed portion of the hinge sleeve. A reversal of parts heretofore mentioned will be obvious. The thickness of the bifurcated parts 2 and 3 and the part 6 is substantially identical as illustrated.

For hinging the temple and frame parts described, the openings 4, 5 and 8 are arranged in alignment for receiving an expansible sleeve, the sleeve being capable of modification as hereinafter described and subject naturally to modified pin structure to provide for proper operation and use. In that form of the expansible hinge sleeve shown in Fig. 3, the sleeve is shown of cylindrical tubular form with its outside diameter uniform throughout its length and substantially the diameter of the cylindrical opening 8 in the frame extension 6. The inside surface of the expansible cylindrical tubular sleeve of Fig. 3 has a downwardly converging lower end portion 9, with its inner wall taper corresponding to the taper of conical wall opening 5 of lower leg 2. The balance of the sleeve structure has a uniform diameter and is for concentric arrangement in the openings in parts 2 and 6. The wall thickness of each hinge sleeve corresponds throughout its length to the area between the expanding pin used in the assembly and the walls of the aligned openings in the parts being hingedly associated. Thus with the sleeve of Fig. 3 in position in the aligned openings, the core or pin of Fig. 4 is inserted longitudinally therein. This pin has a tapered head 11 and the balance of its body 12 is of a uniform diameter. Inasmuch as the material of the sleeve and pin comprehend the entire area within the aligned openings 4, 5 and 8, the seating of the pin will expand the thickened tapered lower end 9 of the sleeve outward against the tapered wall 5 and simultaneously force the upper end portion of the sleeve laterally against the tapered face 4 of upper leg 2 and into downwardly converging tapered form. This is brought about by the lower end of portion 12 of the pin acting against the lower converging wall 9 of the sleeve and the outwardly tapering upper end 11 of the pin engaging and expanding the upper cylinder portion of the sleeve portion 10 against the wall of leg 2. It is to be understood that the diameters of the respective parts must be so determined as to provide a snug hinge fit and must not produce a too close face engagement between the parts, unless of course, in instances where the work and material call for a positive riveting action. In the present illustration the seating of the parts should be such as to provide a suitably snug hinge association of the parts, giving suitable hinge action without permitting misalignment of parts.

Figure 1:
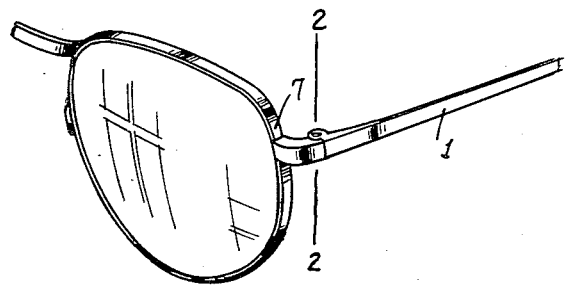
Fig. 1 is a fragmentary perspective of an ophthalmic mounting embodying the invention.
Figure 2:
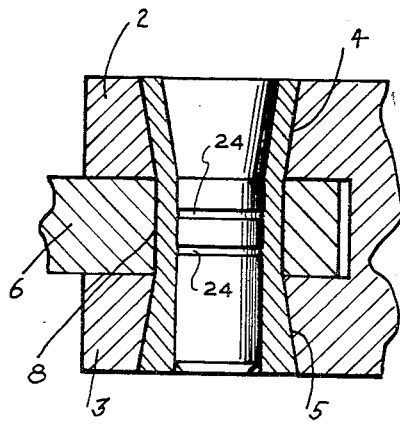
Fig. 2 is an enlarged section on line 2—2 of Fig. 1.

In Fig. 3ª the hinge tube, which is generally of the type illustrated in Fig. 3, has its upper end portion 14 preformed with a flare, this type of hinge tube being particularly adaptable for use in assembling parts where there is a possibility that the tube when being inserted may fall through the aligned openings and thus interfere with the assembly operation. The flare 14 obviously corresponds to the taper of the head 11 of the pin shown in Fig. 4, or in Fig. 4ᵃ, both pins being suitable for use in the assembly of Fig. 2. Likewise, both of the hinge tubes shown in Figs. 3 and 3ᵃ may be used in this same assembly and will function properly.

Referring again to Fig. 4ᵃ it will be seen that in this figure, the bottom end of the pin is recessed as at 15 to provide relatively thin lower end wall portions which can be flared out throughout their periphery by any suitable tool or portions of which can be ruptured from the thin walls and deflected as shown at 16. The use of the flared end or end portions of the structure of Fig. 4ᵃ will obviously function to prevent displacement of the pin from the joint, after completion of the joint, and in the event it is desired to remove the pin of Fig. 4ᵃ the flared end portions at 16 can be removed by filing or otherwise. It is intended that the length of the pin will be such that when the end portion 16 is ruptured or flared laterally to secure the parts together, such flared portions will be contained within the shell body and not project beyond the same. Normally the structure of Fig. 2 will suffice in that frictional engagement between the pin and the hinge sleeve will be ample to hold the parts together.

In Fig. 5 there is shown a sleeve of the general type of Figs. 3 and 3ᵃ in which the material from which the sleeve is made is of a relatively soft material, such as a soft metal or plastic. In this assembly of Fig. 5, a self-tapping screw is used in lieu of the pin of Fig. 4, this screw shown at 17 being provided with a transverse recess 18 at its enlarged upper end for the reception of a screwdriver to force the same into threaded engagement with the soft sleeve 19, to tap itself through the straight shank of the sleeve. The screw will function in the same manner as the pin or core of Fig. 4 or Fig. 4ᵃ in that the lower end portion 20 will engage and expand the converging lower end of the sleeve shown in dotted lines at 21 into full line position for snugly seating against the tapered wall 22 of the lower frame member 23. Obviously with this arrangement the screw will lock itself into the tube by virtue of the self-tapping action and may be removed by reversing the direction of movement of the screw in the usual manner.

In Fig. 6 the assembly provides a threaded screw and a threaded deformable hinge sleeve. In this figure a threaded screw 30 is illustrated having the enlarged head 31 notched at 32 to receive a screwdriver or other operating means. This screw 30 threadedly engages the threads of tubular body 33 preformed to provide the outwardly flared conical face 34 for seating in the conical recess in the part 35. The structure of Fig. 6 is readily assembled by threading the screw 30 into the sleeve 33, the sleeve acting as a nut for the screw so that with the parts properly assembled a complete joint of the general type is provided in which separation of the parts is prevented by the thread engagement. The sleeve 33 shown in Fig. 6 is illustrated in vertical section in Fig. 7, it being seen from this figure that the sleeve is provided with preformed threads 36 for association with the threads on the screw 30. The structure of Fig. 6 and Fig. 7 may be either metal or plastic inasmuch as the threads are preformed and self-tapping operation is not present.

In Fig. 8 the present invention is illustrated in the nature of a rivet in which the parts 37 and 38 are superimposed and provided with conical aligned openings 39. In this form of rivet fastening the sleeve member could have either end preformed into conical shape to be received in the conical recesses, it being sufficient that the connecting core or pin 40 laterally distorts either one end or the other of the sleeve after relative alignment and assembly of the parts. The use of either of the structures will be similar and the joint will approximate the disclosures of the other modifications.

The deformable tube which forms an essential part of the present invention may in many instances be formed of nylon or other suitable plastic and the use of this material is quite desirable inasmuch as it has the inherent characteristics of a lubricant thereby providing against corrosion which would prevent a smooth movement of the hinge member. Whether the material of the deformable tube is a plastic or a soft metal it will tend to flow in the grooves 24 formed in the pin and prevent axial movement of the pin and its displacement from the joint. The material of the deformable tube, having pressure applied thereto as a result of forming the joint, sets up stresses in the assembly resulting in the movement of the metal or plastic of the tube into the grooves 24. In all of the various developments the fastening unit is contained within the confines of the outer walls of the unit thus providing a smooth outer surface. In Fig. 6 there is a modification of this concept in that the screw head 31 is shown at the outer side of the wall of the structure. However, in this instance the structure could be recessed for receiving the screw head 31 so that the hinge assembly will be entirely contained.

What I claim is:

1. In a hinge assembly, a pair of spaced parts formed with aligned openings the walls forming said openings each flaring outwardly throughout its length to form inwardly tapered conical seats, an intermediate body member formed with a cylindrical opening axially aligned with the openings in said spaced parts, the opening in said intermediate body member having the same diameter throughout its length as the minimum diameter of said flared openings; a deformable tubular hinge member arranged in said aligned openings, said hinge member having a uniform outer diameter throughout its length and having one end portion with its inner wall surface converging at approximately the angle of one of said conical seats, and a core member for axial movement into said tubular hinge member, said core member having an outwardly flared conical end of such dimension as to expand one end of the deformable hinge member snugly into its conical seat, the other end of said core member having such a diameter as to urge the converging inner wall of the hinge member snugly into its conical seat.

2. The structure of claim 1 characterized in that the core member is formed with an axial recess at one end and a portion of the wall defining the recess is flared outwardly to provide a locking means against axial movement of the core.

3. The structure of claim 1 characterized in that the core member is formed with medially arranged annular grooves for permitting reception of adjacent portions of the hinge member.

4. In a hinge assembly connecting a temple member to one end of an ophthalmic frame member wherein one of said members has a pair of outer spaced upper and lower hinge parts between which is fitted an intermediate lug element on the other member and in which each of said spaced hinge parts has a conical opening therethrough tapering inwardly from its outer face and said intermediate lug element has a cylindrical opening therethrough coaxial with both of said conical openings; the combination with said spaced hinge parts and the lug element of a deformable tubular hinge member extending through both of said spaced hinge parts and through said intermediate lug element and being expanded laterally at its opposite ends into conically tapered portions of corresponding shape with said conical openings in snug seating engagement therein, and further having a cylindrical intermediate portion fitting said cylindrical opening in said intermediate lug element, and a core member coaxial with said tubular hinge member and being axially inserted therein, said core member being entirely accommodated within the tubular hinge member and having an outwardly flared conical end of such dimension as to laterally expand the surrounding wall of the deformable tubular hinge member snugly against its respective conical seat while the other end of said core member is adapted to laterally urge the surrounding wall of said tubular hinge member into snug engagement with its respective conical seat upon axial movement of the core member into its final assembled position within the tubular hinge member.

References Cited in the file of this patent

UNITED STATES PATENTS

| | | |
|---|---|---|
| 1,616,965 | Fielding | Feb. 8, 1927 |
| 1,965,230 | Gasstrom | July 3, 1934 |
| 1,978,935 | Douglas | Oct. 30, 1934 |
| 2,036,551 | Stevens | Apr. 7, 1936 |
| 2,088,955 | Hamill | Aug. 3, 1937 |
| 2,191,632 | Smith | Feb. 27, 1940 |
| 2,264,747 | Fether | Dec. 2, 1941 |
| 2,296,470 | Keehn | Sept. 22, 1942 |
| 2,348,589 | Auten | May 9, 1944 |
| 2,366,965 | Johnson | Jan. 9, 1945 |
| 2,384,321 | Lees | Sept. 4, 1945 |
| 2,592,130 | Erb | Apr. 8, 1952 |